Jan. 11, 1966    P. R. FRANKLIN    3,228,205
PALLETIZED REFRIGERATION UNIT
Filed Sept. 12, 1963    2 Sheets-Sheet 1
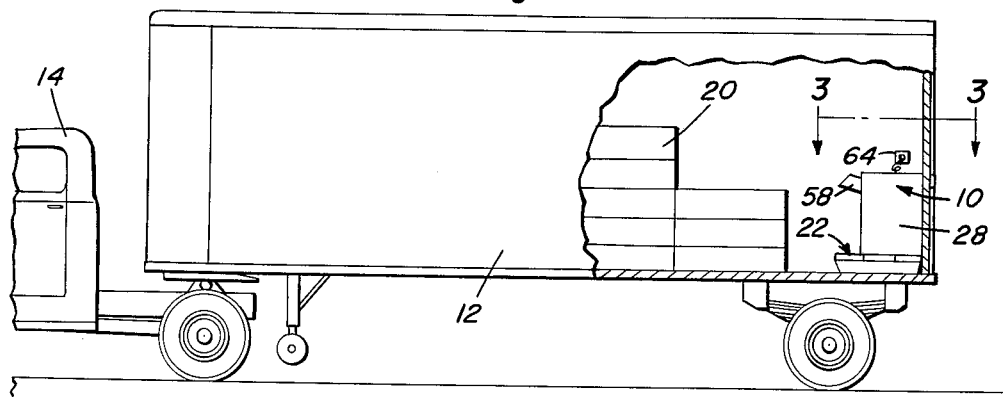
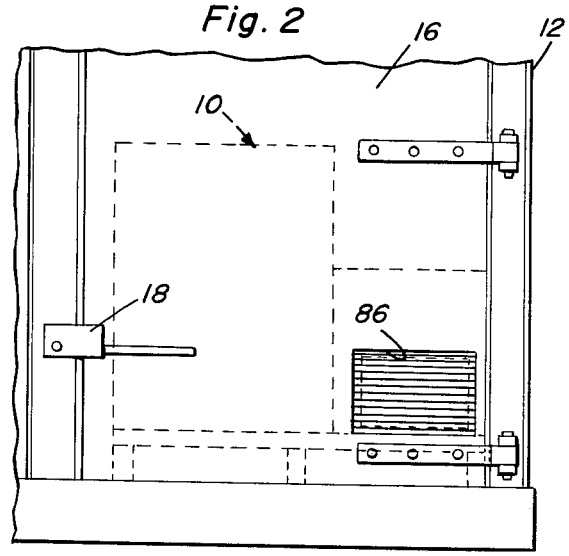
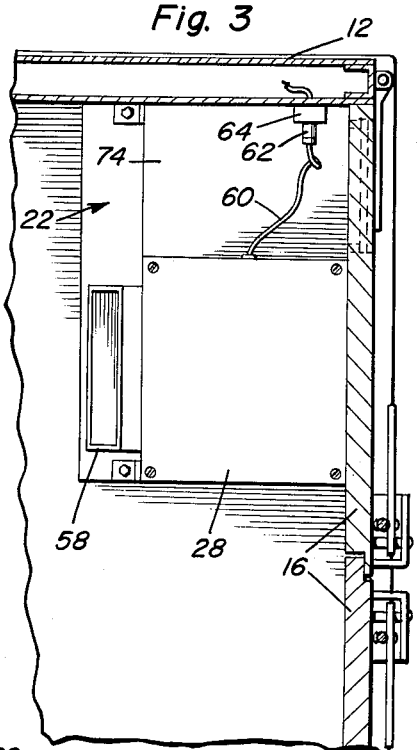
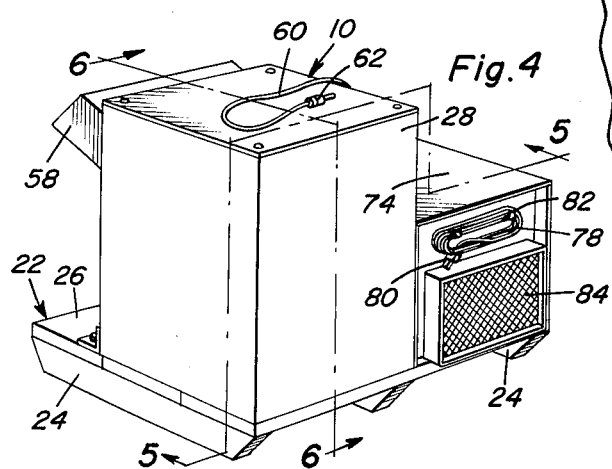
Paul R. Franklin
INVENTOR.
BY *Clarence A. O'Brien*
*and Harvey B. Jacobson*
Attorneys Jan. 11, 1966 P. R. FRANKLIN 3,228,205
PALLETIZED REFRIGERATION UNIT
Filed Sept. 12, 1963 2 Sheets-Sheet 2

Paul R. Franklin
INVENTOR.

BY *Clarence A. O'Brien*
*and Harvey B. Jackson*
Attorneys

United States Patent Office 3,228,205
Patented Jan. 11, 1966

3,228,205
PALLETIZED REFRIGERATION UNIT
Paul R. Franklin, 1263 Lakeshore Blvd.,
Jacksonville, Fla.
Filed Sept. 12, 1963, Ser. No. 308,484
6 Claims. (Cl. 62—237)

The present invention generally relates to a refrigeration unit for use in combination with vehicles such as load carrying vehicles employed in conveying refrigerated products.

Many products are conveyed by vehicles while under refrigeration. The refrigeration of such products has been accomplished by various means including the provision of relatively expensive permanently installed refrigeration systems in the vehicle structure. For example, refrigerated truck bodies have been provided in which the components of the refrigeration system are permanently installed on the load carrying body generally at the forward end thereof. Such an assembly is not only expensive but also adds to the overall weight of the truck body thereby reducing the pay load which can be carried and also the permanently installed refrigeration system frequently requires the services of a skilled refrigeration maintenance man for repair and service. Accordingly, it is a primary object of the present invention to provide a refrigeration unit which is palletized by virtue of it being mounted on a pallet so that a fork lift truck may easily place it in a load carrying body or remove it therefrom when desired.

The palletized refrigeration unit of the present invention has special utility in combination with trucks of the type which may be used for other purposes than conveying refrigerated products. For example, when delivering items to a grocery store, a supermarket or the like, it quite often occurs that on one day refrigerated products are delivered and on other days, non-perishable or non-refrigerated products are delivered. Thus, with the palletized unit of the present invention, the pay load which can be carried that does not need refrigeration can be increased by the weight of the removed palletized refrigeration unit.

A further object of the present invention is to provide a palletized refrigeration unit having all of the conventional components of a refrigeration system which may be plugged into a source of electrical energy at dockside with the unit also including a "cold hold" plate in the form of a container having a quantity of eutectic fluid therein which encloses a cooling coil whereby the eutectic liquid may be frozen while the palletized refrigeration unit is on a loading dock or the like and when the refrigeration unit is required, it is merely loaded onto the load carrying vehicle, preferably at the rear of the body and a small direct current fan motor may be plugged into a suitable outlet connected with the electrical supply of the vehicle for circulating air over the "cold hold" plate and also over the articles being conveyed in the load carrying body. This structure substantially eliminates any failure of the system inasmuch as only a small electric fan motor is operated while the truck is moving over the road and the quantity of eutectic liquid may be varied depending upon the time of operation of the vehicle. The device is especially useful but not necessarily limited to delivery over relatively short distances, such as those that do not require more than one or two days time since a practical unit may be constructed in which the refrigeration unit may retain the load carrying body at a predetermined temperature for a period of 24 to 48 hours.

Other objects of the present invention reside in its simplicity of construction, weight saving characteristics, elimination of expensive and costly defrost systems, and substantial elimination of refrigeration system failure and consequent repair and down-time of the vehicle involved.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a truck with a portion of the load carrying body broken away illustrating the palletized refrigeration unit of the present invention installed therein;

FIGURE 2 is a rear elevational view of the truck illustrating in dotted line the positioning of the refrigeration unit therein;

FIGURE 3 is a plane sectional view taken substantially upon a plane passing along section line 3—3 of FIGURE 1;

FIGURE 4 is a perspective view of the palletized refrigeration unit of the present invention;

Figure 5:
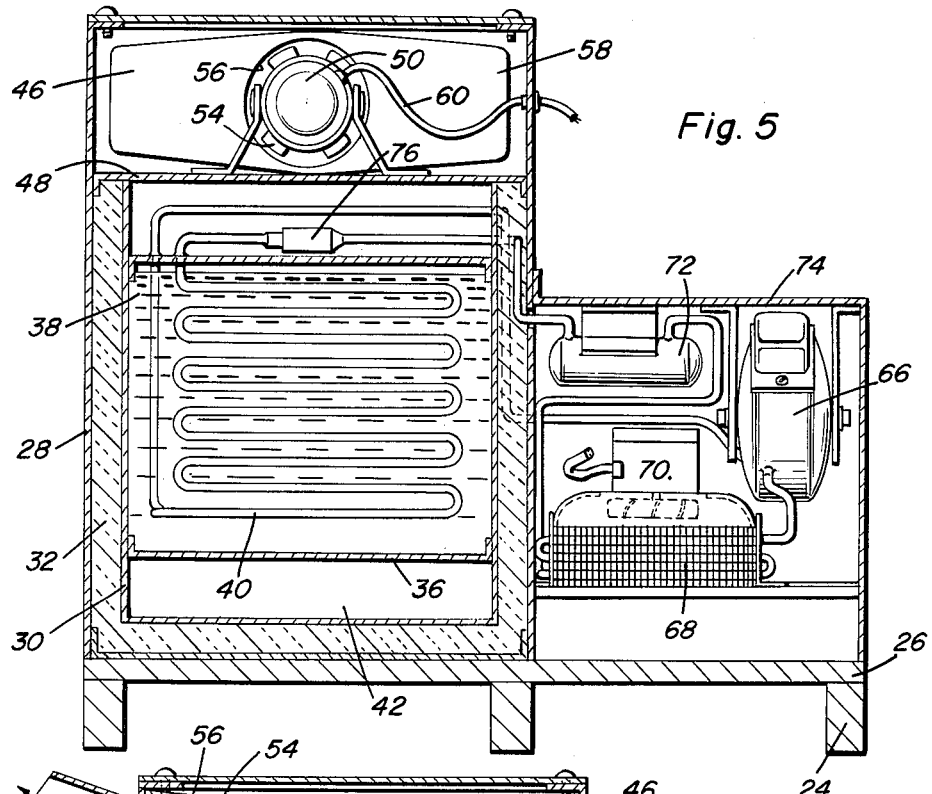
FIGURE 5 is a vertical sectional view taken substantially upon a plane passing along section line 5—5 of FIGURE 4 illustrating further structural details of the palletized refrigeration unit of the present invention.

Referring now specifically to the drawings, the palletized refrigeration unit of the present invention is designated generally by the reference numeral 10 and is illustrated installed in the load carrying body 12 of a vehicle such as a conventional tractor trailer unit in which the load carrying body 12 is in the form of a trailer and a conventional tractor 14 is employed for towing the trailer 12 in a conventional manner. The trailer or load carrying body 12 includes the usual pivotally mounted doors 16 at the rear thereof provided with any suitable latch mechanism 18 for enabling access to the load carrying interior of the body 12 in which is placed products that need to be conveyed at a reduced temperature, such products being designated by numeral 20.

The palletized refrigeration unit 10 is mounted on a pallet 22 which is conventional in construction and includes the usual stringers 24 and transverse planks or boards 26 which form a load supporting surface for the refrigeration unit 10.

The refrigeration unit 10 includes a casing or housing 28 provided with a concentric inner wall 30 over a major portion of the lower area thereof with insulation material 32 disposed between the casing or housing 28 and the inner wall 30 thus forming an insulated compartment for circulation of air. Disposed within the insulated compartment 34 is a container 36 having a supply of liquid 38 therein in the form of a eutectic liquid capable of being frozen but which will not expand or change in volume to any substantial degree. The freezing point of the liquid may be at any suitable temperature depending upon the temperature desired to be maintained in the load carrying body 12. For example, the freezing temperature of the eutectic liquid 38 may be below the freezing temperature of water or even below 0° F. The quantity of liquid 38 does not quite completely fill the container 36 and is completely enclosed and provided with a serpentine cooling coil or heat exchanger 40 therein for lowering the temperature of the freezable liquid 38 to a temperature so that the freezable liquid will solidify.

Figure 6:
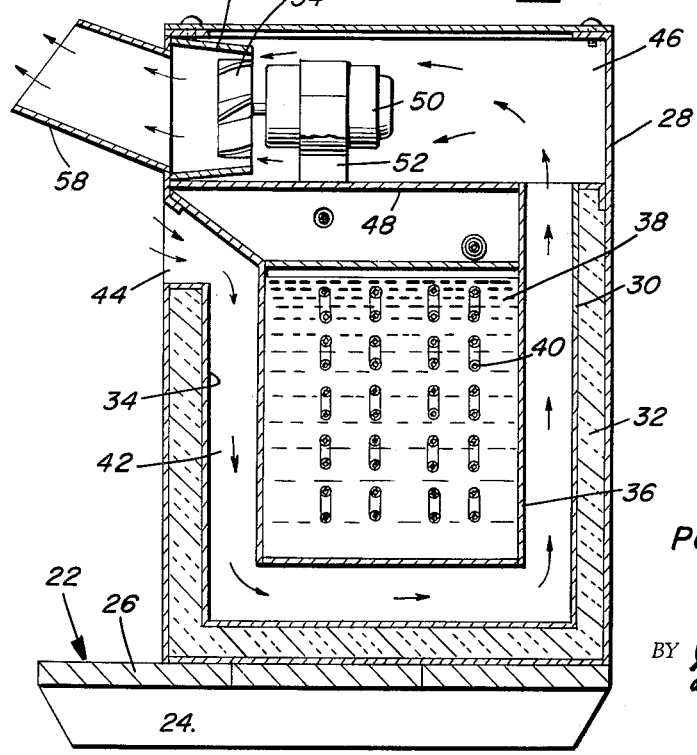
FIGURE 6 is a sectional view taken substantially upon a plane passing along section line 6—6 of FIGURE 4 illustrating further structural details of the palletized refrigeration unit.

As illustrated in FIGURE 6, the container or receptacle 36 is spaced from the inner wall 30 thus forming an air passageway 42 leading inwardly and downwardly from an air inlet 44, under the bottom of the container and thence upwardly to an outlet chamber 46 separated from the remainder of the casing 28 by a partition wall 48.

Mounted in the air outlet chamber 46 is a small electric fan motor 50 carried by a suitable supporting bracket 52 and rotating a fan 54 disposed within an adapter or shroud 56 for discharging air outwardly through a discharge chute or spout 58 which extends laterally outwardly and upwardly from the same side of the casing 28 as the warm air inlet 44. The fan 54 may be of any conventional type either of the axial flow type or of the squirrel cage fan type and the motor 50 is of any suitable capacity capable of circulating adequate air. The motor 50 is a D.C. motor of relatively low horsepower capacity and includes an electrical conductor 60 extending outwardly through one wall of the casing 28 to a suitable male plug 62 that may be inserted into a female outlet 64 mounted in the wall of the load carrying body 12 and which is electrically connected to the electrical system of the vehicle which may be of either the 6 volt or 12 volt type and the addition of this outlet would provide no particular problem to any skilled mechanic in that the outlet may be mounted in the wall of the load carrying body and connected into the electrical system such as is normally employed for clearance lights and the like on the vehicle.

This, with the refrigeration unit 10 of the present invention installed within the load carrying body 12, the fan and fan motor may be operated for circulating air by merely plugging the male plug 62 into the outlet 64 and, if desired, a suitable switch may be provided in the tractor cab for control thereof or the fan may be operated continuously while the refrigeration unit is installed within the load carrying body. While the air inlet for the warm air and the cold air outlet are on the same sides of the casing, this may be varied as desired but due to the upward direction of the chute or discharge spout 58, the cold air will be directed forwardly and upwardly so that as the cold air is discharged, it will normally settle downwardly over the products to be refrigerated and the return air is taken in from a position elevated from the floor surface thus cooling air that has been somewhat warmed with it being pointed out that the orientation and location of the air inlets and outlets may be varied as desired with it only being necessary that the air circulate over the external surface of the container or receptacle which is in the form of a cold hold plate or container so that the air will be effectively cooled by the surface frictional engagement with the external surface of the container or receptacle 36 in good heat exchange relation.

In addition to the cooling coil 40 which is the evaporator of the refrigeration system, the refrigeration system includes a motor compressor unit 66, a condenser unit 68, a condenser fan and motor assembly 70 and a receiver 72 all mounted within a laterally extending casing 74 attached to the casing 28 containing the evaporator coil 40. The receiver 72 is connected to the evaporator coil 40 through a suitable expansion valve or orifice 76 which may be any suitable type of restriction having a thick size opening since the refrigeration system will normally be operated while the unit is orientated on a loading dock or the like until the freezable eutectic liquid is completely frozen. Of course, suitable controls are provided for shutting down the refrigeration system when the freezable liquid is completely frozen to prevent any possible damage to the refrigeration system. Also, the components of the refrigeration system are conventional insofar as association and controls are concerned and the discharge end of the evaporator coil 40 is connected to the intake side of the compressor in a conventional manner. Electrical energy is supplied to the motor compressor unit 66 and the condenser fan and motor assembly 70 by virtue of an electrical cord 78 having a male plug 80 on the end thereof which may be plugged into any suitable outlet normally provided on a loading dock such as a source of 110 voltage or ordinary household current. The conductor 78 may be stored on a suitable supporting bracket 82 when not being used and the refrigeration system components may be supported from the laterally extending housing 74 in any suitable manner to reduce the vibrations and shocks transmitted thereto. Also, one wall of the casing 74 is provided with an opening having a reticulated closure such as a screen or the like 84 for admitting and discharging air passed over the condenser coil 68 in a known manner. Inasmuch as the refrigeration system is normally not operative when the unit is installed in the load carrying body 12, the air inlet and outlet for the condenser 68 may be varied as desired to enable adequate air circulation to cool the hot gases as they are discharged from the compressor in a conventional manner. Thus, as the unit is orientated on a loading dock, the plug 80 is inserted into a suitable female outlet and the refrigeration system operates to reduce the temperature of the liquid eutectic solution 38 and completely freeze such solution. Thereafter, the refrigeration unit may be loaded onto the load carrying vehicle and the plug 62 inserted into the outlet 64 for D.C. current thus operating the fan for circulating air within the load carrying body 12.

In certain operations, it may be desirable to provide an opening 86 in the rear door 16 of the load carrying body 12 and align the screen covered opening 84 therewith so that the refrigeration unit may be operated while installed in the load carrying body by connecting the plug 80 to an extension cord or the like so that the source of electrical energy such as a convenient 110 voltage outlet may be connected with the refrigeration system for operation thereof without necessarily taking the palletized refrigeration unit out of the load carrying body, for example, if only a portion of the products 20 are to be unloaded at a particular loading dock, one of the pivotal doors 16 may be opened and the refrigeration unit energized by extending the electrical cord 78 out through the opened door and the plug 80 may be plugged into a suitable outlet. Then, while the articles 20 are partially unloaded through the door 16 which has been opened, the refrigeration unit will not only circulate air due to operation of the fan 54 from the battery of the truck but also the refrigeration system will be energized for again lowering the temperature of the eutectic solution or fluid 38.

The palletized refrigeration unit has no installation cost whatsoever since it is placed in any load body which may or may not be insulated depending upon the temperatures involved. All previously known permanent installations require a costly installation and even if such units are constructed so that certain components thereof may be readily removed, the installation cost still is quite high. The present unit is a considerable weight saving arrangement since it may be loaded onto or removed from a vehicle as needed. This is especially desirable in some situations which may carry meat and produce requiring refrigeration one day and non-perishable dry goods or groceries the next day which enables the pay load to be increased by at least the weight of the palletized refrigeration unit thus enabling a considerable saving in the cost of operation of the truck unit. The present invention also involves a relatively small maintenance cost since conventional refrigeration units have elongated pipes, electrical conductors or internal combustion engines for power all of which are subject to damage or breakage. This unit also involves no defrost system whatsoever since the cold plate will actually be defrosted while the compartment is being cooled. This unit has the refrigeration capabilities thereof built up before loading thus eliminating any spoilage of the refrigerated load which sometimes occurs if a portion of a conventional refrigeration system becomes inoperative for one reason or another.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable space cooling unit comprising a refrigeration system including a compressor assembly, a condenser, a receiver, a cooling coil, and an expansion valve located between the receiver and cooling coil with the compressor, condenser, receiver, expansion valve and cooling coil being arranged in serial relation, a pallet supporting said refrigeration system for movement onto or removal from a load carrying vehicle body, a receptacle enclosing said cooling coil, a quantity of freezable solution in said receptacle for freezing when the cooling coil is operative thereby providing a supply of frozen solution, a casing for the receptacle disposed at least in partially enclosing spaced relationship thereto to provide an air passage whereby air conveyed through the casing will pass over the receptacle and be cooled thereby, and fan means operable independently of the refrigeration system located within the casing for circulating air over the receptacle, said casing having an air inlet and air outlet communicating with the fan means for intake and outlet of air in relation to the load carrying body for cooling the interior of the load carrying body.

2. The structure as defined in claim 1 wherein said air outlet is provided with an upwardly directed discharge chute for discharging the cooled air upwardly and towards a remote portion of the load carrying body from the casing.

3. The structure as defined in claim 2 wherein said freezable solution is in the form of a eutectic liquid, said cooling coil including a multiplicity of zigzag coil assemblies immersed in said liquid.

4. The structure as defined in claim 3 wherein said fan means includes a small capacity D.C. motor, and means connected with the motor for electrically connecting the D.C. motor with the electrical system of the load carrying vehicle having the load carrying body mounted thereon whereby the fan means may be operative during over-the-road operation of the vehicle.

5. The structure as defined in claim 4 wherein said casing is of double walled construction with the inner walls spaced concentrically from the outer wall, and insulation material disposed between the inner and outer walls of the casing for insulating the casing, the inner wall being spaced from the receptacle and defining one wall of the air passageway.

6. The structure as defined in claim 5 wherein the refrigeration system is provided with an electrical conductor for operation thereof when disposed on a loading dock or the like by convenient connection with an electrical socket for enabling the refrigeration system to be operative and the freezable solution completely frozen before loading of the palletized cooling unit onto the load carrying vehicle body.

References Cited by the Examiner

UNITED STATES PATENTS

| | | | |
|---|---|---|---|
| 2,007,288 | 7/1935 | Thomson | 62—237 X |
| 2,160,760 | 5/1939 | Smith | 62—406 |
| 2,308,079 | 1/1943 | Henney | 62—236 X |
| 2,483,100 | 9/1949 | Morrison | 62—448 X |
| 2,497,734 | 2/1950 | Kuklich | 62—448 X |
| 2,512,576 | 6/1950 | Cross | 62—59 |
| 2,515,825 | 7/1950 | Grant | 62—406 X |
| 2,839,198 | 6/1958 | Lefevre | 108—55 X |
| 2,875,595 | 3/1959 | Kleist | 62—406 X |
| 2,884,768 | 5/1959 | Gould | 62—243 X |
| 2,957,317 | 10/1960 | Parker | 62—239 X |
| 3,006,167 | 10/1961 | Lorch | 62—438 |

ROBERT A. O'LEARY, *Primary Examiner.*